United States Patent Office 3,097,608
Patented July 16, 1963

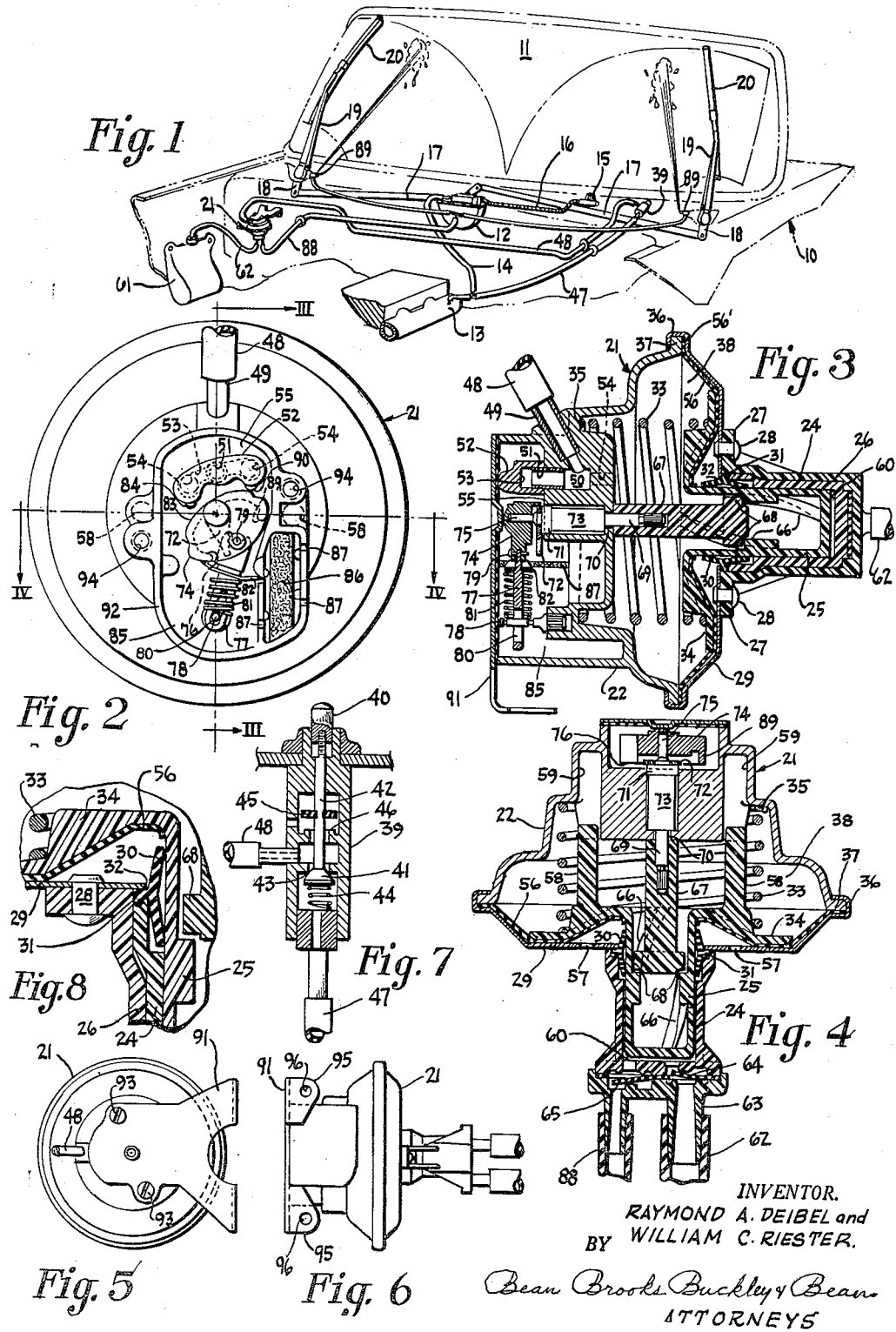

3,097,608
WINDSHIELD WASHER
Raymond A. Deibel, Cheektowaga, and William C. Riester, Williamsville, N.Y., assignors to Trico Products Corporation, Buffalo, N.Y.
Filed Nov. 29, 1960, Ser. No. 72,466
5 Claims. (Cl. 103—43)

The present invention relates to an improved windshield washer pump which is utilized for projecting a spray of solvent onto an associated windshield.

It is one object of the present invention to provide a highly simplified fluid pressure actuated windshield washer pump which is relatively small in size and is therefore capable of being mounted at any convenient position in the vehicle engine compartment. A related object of the present invention is to provide a windshield washer pump which is self-priming and can therefore be mounted above the solvent reservoir with which it is associated, thereby further widening the range of locations at which it may be mounted.

Another object of the present invention is to provide a windshield washer pump which is simple to fabricate and which utilizes a relatively small number of relatively small parts. Other objects and attendant advantages of the present invention will readily be perceived hereafter.

The windshield washer pump of the present invention includes a housing having a solvent chamber therein. In communication with the solvent chamber is a first conduit leading from a solvent reservoir and a second conduit leading to the jets mounted below the windshield. Suitable check valves are provided in these conduits to permit the washer pump to effect its pumping action and thereby transfer solvent from the reservoir to the jets. A piston is mounted for reciprocatory movement in the solvent chamber, this piston effecting the intake and discharge strokes of the solvent. A fluid pressure chamber is provided within the washer pump and this chamber is adapted to be placed in communication with a source of fluid pressure when a suitable operator actuated control is manipulated. When the fluid pressure chamber is subjected to fluid pressure, the intake stroke of the piston will be effected. The reciprocatory movement of the piston is converted to an oscillatory movement of a slide valve, which terminates communication between the fluid pressure source and the fluid pressure chamber when the intake stroke is completed and substantially simultaneously vents the fluid pressure chamber to permit a spring, which was compressed during the intake stroke, to expand to effect the discharge stroke. During the discharge stroke, the spring-actuated piston movement is converted to further oscillatory movement of the slide valve which, at the completion of the discharge stroke, again places the fluid pressure chamber in communication with the fluid pressure source to thereby again initiate the intake stroke. The foregoing intake and discharge strokes are automatically effected by the above-mentioned slide valve as long as the vehicle operator permits the control leading to the source of fluid pressure to remain in communication with the washer pump. Because the slide valve oscillates about an axis substantially parallel to the axis of reciprocation of the piston, it oscillates in a direction substantially perpendicular to the above-mentioned axis of piston reciprocation. Because of this orientation between the piston and the slide valve, the washer pump can be made relatively short and therefore will occupy relatively little space. Furthermore, because it can be made relatively short, certain of the components of the pump are relatively small.

The present invention will be more fully understood when the following portions of the specification are read in conjunction with the accompanying drawings wherein:

FIG. 1 is a fragmentary perspective view of an automotive vehicle mounting the improved pump of the present invention;

FIG. 2 is a plan view of the pump showing its valve mechanism;

FIG. 3 is a view taken along line III—III of FIG. 2;

FIG. 4 is a view taken along line IV—IV of FIG. 2;

FIG. 5 is a plan view of the washer pump similar to FIG. 2 but showing the combined cover and bracket thereof mounted thereon;

FIG. 6 is an elevational view of the pump shown in FIG. 5;

FIG. 7 is a view, partially in cross section, of the manual valve used to actuate the pump; and FIG. 8 is an enlarged detail view showing the manner in which the piston seal is mounted.

In FIG. 1 automotive vehicle 10 is shown having a windshield 11 mounted thereon in the conventional manner. Mounted on the fire wall of the vehicle is a wiper motor 12 connected to the engine intake manifold 13 by a conduit 14. A control 15 is mounted on the vehicle dashboard and is coupled to wiper motor 12 by flexible cable 16. Links 17 each have one of their ends connected to a crankarm on motor 12 and their other ends pivoted to crankarms 18 mounted on rockshafts (not shown) journalled in the cowl of the vehicle, the rockshafts also mounting wiper arms 19, which in turn mount wipers 20. As is well understood in the art, when control 15 is manipulated, wiper motor 12 is placed in operation and causes wipers 20 to oscillate back and forth across windshield 11.

The washer pump 21 of the present invention may be mounted anywhere within the engine compartment but is shown in FIG. 1 as being mounted on the fire wall. Washer 21 includes an upper housing unit 22 which may be made of suitable die-cast material. A cylinder 24 is provided which defines a chamber in which piston 25 is adapted to reciprocate. Cylinder 24 is held in position by bracket 26, the inner surface of which is of a radius for complementary mating relationship with a portion of the outer wall of cylinder 24. Bracket 26 also has ears 27 thereon for receiving rivets 28 which secure them to metal plate 29. Before the rivets 28 are deformed to secure ears 27 to plate 29, the extension 31 of seal 30 is placed between the top of cylinder 24 and the inner edge 32 of plate 29, the assembly affected by rivets 28 holding seal 30 in position. After the foregoing subassembly has been completed, a spring 33 is placed between the outer flange portion 34 of piston 25, which rides in cylinder 24, and the shoulder 35 of upper housing 22. Thereafter the edges 36 of plate 29 are deformed about flange 37 of upper housing 22 to maintain the aforementioned elements in assembled condition. The outer portion 56' of diaphragm 56 is secured in position against flange 37 by the deforming of edges 36.

A valving arrangement is provided for permitting the engine intake manifold 13 to communicate with vacuum chamber 38 when the manual control 39 (FIGS. 1 and 7) is actuated. Control 39 is shown mounted on the vehicle dashboard, but it will be appreciated that it may be mounted at any other suitable location in the vehicle, including the floor board where it may be actuated by foot. More specifically, when button 40 of control 39 is depressed, valve 41 which is mounted on the other end of stem 42 from button 40 will be moved off of its seat 43 against the bias of spring 44. Thereafter valve 45, which is mounted on stem 42, will engage seat 46. This will permit communication between conduit 47 leading from the engine intake manifold 13 and conduit 48 leading to the washer pump 21. Conduit 48 in turn is mounted on nipple 49 in communication with valve chamber 50. A hollow bushing 51 has one end thereof pressed into engagement with the walls of chamber 50 and the other end pivotally mounting slide valve 52 having a kidney-shaped groove 53 (FIG. 2) therein. In the position shown chamber 50 is in communication with conduits 54 (FIGS. 2 and 3) leading from the seat 55 on which slide valve 52 oscillates, and chamber 38. The communication between the engine intake manifold 13 and chamber 38 through the above-described path when slide valve 52 is in the position shown in FIG. 2, will cause evacution of chamber 38. This will cause piston 25 to move to the left in FIG. 3 because diaphragm 56 provides a seal for chamber 38, diaphragm 56 being fastened at 56′ and being preformed to lie in sealing contact with the flange 34 of piston 25. Thus the flange 34 of piston 25 and diaphragm 56 move to the left in unison when chamber 38 is evacuated. This action is permitted because of vents 57 provided in plate 29. Extending from the flange portion 34 of piston 25 are two cylindrical pins 58 (FIGS. 2 and 4) which ride in slots 59, this arrangement causing stabilized reciprocatory movement of piston 25. It will of course be appreciated that when piston 25 is moved in the above-described manner, this movement will be effected against the bias of spring 33 and the latter will be compressed as the piston 25 moves to effect the intake stroke.

Chamber 60 is in communication with reservoir 61 (FIG. 1) through conduit 62, nipple 63 (FIG. 4), and check valve 64. It will of course be appreciated that as piston 25 moves upwardly in FIG. 4, check valve 64 will open to permit solvent to move into chamber 60. During this intake stroke, check valve 65 will remain closed, as is well understood in the art.

As piston 25 moves upwardly, the spiral grooves 66 therein will cause shaft 67 to rotate because followers 68 of shaft 67 are located in spiral grooves 66. The end of shaft 67, which is remote from followers 68, is pressed onto stem 69 which is journalled at 70 and 71. Remote from the pressed connection between stem 69 and shaft 67, a push bar 72 is rigidly affixed to shaft 73. A kicker 74 is rotatably mounted on extension 75 of shaft 73.

As piston 25 effects its intake stroke, shaft 73 mounting kicker 74 will be caused to rotate because of the spiral and follower connection 66—68. As seen from FIG. 2, this rotation will cause push bar 72 to move in a clockwise direction. This movement will continue until such time as the end of push bar 72 engages shoulder 76 of kicker 74 and will cause it to move in a clockwise direction until such time as push rod 77, which pivots in a counterclockwise direction about pin 78 during the above clockwise motion of kicker 74, moves sufficiently far so that it is "over center" and snaps kicker 74 in a clockwise direction. The foregoing is possible because the upper end of push bar 77 is pinned to kicker 74 by pin 79 and the other end thereof has a slot 80 therein which slides on pin 78. It will be appreciated that as push bar 77 moves in a counterclockwise direction from the position shown in FIG. 2, slot 80 will also move downwardly. However, since spring 81 is confined between pin 78 and plate 82, it will be caused to compress. After the push bar goes "over center," spring 82 will expand and give kicker 74 an added movement in a clockwise direction. When this occurs, the top portion 83 of kicker 74 will engage shoulder 84 of slide valve 52 and cause it to pivot in a clockwise direction (FIG. 2) thereby causing groove 53 therein to cease communication with conduits 54. This action will terminate communication between conduit 48 leading from the vacuum source, and fluid pressure chamber 38. When slide valve 52 is moved to its new position, conduits 54 are exposed to the interior of chamber 85 which in turn is in communication with the atmosphere through filter 86 and slots 87 in the upper pump housing 22. Therefore chamber 38 will be vented to the atmosphere and spring 33 therein will be permitted to expand, thereby causing piston 25 to effect the discharge of solvent taken into chamber 60 during the intake stroke. It will of course be appreciated that during the downward stroke check valve 64 will close and check valve 65 will open to permit the solvent to flow into conduit 88 leading to jets 89 in the cowl of the vehicle.

As piston 25 moves downwardly, the spiral-follower arrangement 66—68 will cause shafts 67 and 73 to rotate in a counterclockwise direction, as viewed from FIG. 2. This will cause push bar 72 to also move in a counterclockwise direction until such time as it engages shoulder 89 on kicker 74. Thereafter, kicker 74 will also move in a counterclockwise direction and cause push bar 77 to pivot in a clockwise direction about pin 78 (FIG. 2). The foregoing action will continue until such time as push bar 77 is "over center" whereupon spring 81, which was compressed during part of the movement of push bar 77, will expand and give kicker 74 an added movement in a counterclockwise direction. Thereafter edge 83 of kicker 74 will engage shoulder 90 of slide valve 52 and move it back to the position shown in FIG. 2 wherein groove 53 therein effects communication between conduits 54 and chamber 50 which is in communication with conduit 48 leading to the source of vacuum. This will cause fluid pressure chamber 38 to be evacuated and cause piston 25 to again move to effect the intake stroke of the pump. It can thus be seen that as long as the vehicle operator maintains button 40 of control valve 39 actuated to permit the source of vacuum to communicate with pump 21, there will be alternate intake and discharge strokes effected due to the automatic valve mechanism within pump 21. This in turn will cause a series of squirts of washer solvent to be intermittently squirted onto the windshield. When it is desired to terminate washer pump operation, it is merely necessary to release button 40. This action permits valve 41 to return to seat 43 (FIG. 7) and therefore terminate communication between conduits 47 and 48, thereby shutting off the vacuum source from the washer pump. Regardless of the position of slide valve 52 when button 40 is released, the absence of the vacuum influence on chamber 38 will permit spring 33 to expand and therefore return piston 25 to the position shown in FIGS. 3 and 4. Furthermore, the downward movement of piston 25 will cause slide valve 52 to return to the position shown in FIG. 2 for placing conduit 48 leading from the vacuum source in communication with fluid pressure chamber 38 so that when control 39 (FIG. 7) is actuated the above-described cycle of washer operation will again be realized.

A combined mounting bracket and cover 91 (FIGS. 5 and 6) is provided for the washer pump 21. This cover is fabricated from sheet stock and is adapted to fit on rim 92 (FIG. 2) of the housing which contains the above-described valving mechanism for effecting pump operation. Cover 91 has apertures therein which receive screws 93 which are threaded into tapped holes 94 (FIG. 2). Furthermore, one end portion of cover 91 is formed into flanges 95 having apertures 96 which receive screws or the like for fastening the washer pump 21 at any suitable position on the vehicle.

As described above, button 40 of control 39 (FIG. 7) had to be maintained in a depressed condition for the length of time that pump operation was desired. In such an arrangement in order to obtain a windshield cleaning operation it was necessary to first turn on the wiper motor by the manipulation of control 15, thereafter maintain control button 40 depressed for the length of time that washer pump operation was desired, and after releasing button 40 it was required that control 15 again be manually manipulated to terminate cleaning operation. If desired, washer pump 21 may be modified so that it will remain in operation after a control is first actuated without any requirement for holding the control in a washer actuating condition. More specifically, control 39 (FIG. 7) may be eliminated and in lieu thereof a Bowden wire or any other type of detent may be provided for giving a detent action relative to kicker 74. More specifically, when action of the pump is desired, the detent may be disengaged from kicker 74 whereupon it will operate in the above-described manner. However, when it is desired to terminate pump operation, the manipulation of the Bowden wire control or the like will cause a detent to engage kicker 74 to prevent it from causing slide valve 52 from returning to the position shown in FIG. 2. More specifically, the detent will engage kicker 74 before it reaches its position shown in FIG. 2 but after the push rod 77 has gone over center so that when the detent is released, spring 81 will expand to move kicker 74 to its position shown in FIG. 2, whereupon kicker 74 will in turn move slide valve 52 to the position shown in FIG. 2 to thereby initiate the intake stroke of the pump. It will further be appreciated that instead of using a Bowden wire to engage kicker 74 short of the position where it causes slide valve 52 to be in the position shown in FIG. 2, any other type of motor means may be utilized.

Seal 30 (FIGS. 3 and 4) which surrounds piston 25 provides good sealing in that on the down stroke of piston 25 fluid under pressure which exists between the piston and the cylinder 24 will be exerted on the face of the seal 30 which is not in contact with piston 25 and therefore this additional pressure will promote good sealing. On the intake stroke of the piston, the upward movement of the piston will cause the pressure behind the lower lip of the seal to be released and therefore the seal will not impede upward movement of the piston.

Because of the reciprocating positive displacement type of action provided by pump 21, it can readily be seen that the pump is self-priming and therefore can be mounted at any position within the vehicle compartment, including positions which are above the solvent reservoir 61.

It can thus be seen that the washer pump of the present invention is manifestly capable of achieving the above enumerated objects, and while preferred embodiments have been disclosed, it can readily be understood that it is not limited thereto, but may be otherwise embodied within the scope of the following claims.

What is claimed is:

1. A windshield washer pump comprising a housing, a solvent chamber in said housing, an intake conduit in communication with said solvent chamber, a discharge conduit in communication with said solvent chamber, piston means mounted for reciprocation in said solvent chamber along a predetermined axis to provide an intake stroke and a discharge stroke, check valve means operatively associated with both said intake conduit and said discharge conduit to permit the charging of said solvent chamber with solvent during said intake stroke of said piston means and the discharging of said solvent during said discharge stroke of said piston means, spring means in said housing for biasing said piston means in a direction to effect said discharge stroke, a fluid pressure chamber in said housing adapted to be placed in communication with a fluid pressure source for moving said piston means against the bias of said spring means to effect said intake stroke, valve means operable in synchronism with the movement of said piston means for alternately placing said fluid pressure chamber in communication with said fluid pressure source to move said piston means against the bias of said spring means to effect said intake stroke and for thereafter venting said fluid pressure chamber to thereby permit said spring means to move said piston means to effect said discharge stroke, said valve means including a slide valve oscillatable in a direction which is substantially perpendicular to the axis of reciprocation of said piston means and about an axis which is substantially parallel to the axis of reciprocation of said piston means, linkage means operatively interconnecting said slide valve and said piston means to convert the reciprocatory motion of said piston means into oscillatory movement of said slide valve, said linkage means including cam means telescopically engaging said piston means operatively interconnecting said piston means and said slide valve and sealing means intermediate said solvent chamber and said fluid pressure chamber.

2. A windshield washer system comprising a washer pump and manually actuatable control means movable from a position wherein it permits said washer pump to remain dormant to an actuated position wherein it causes said pump to operate, said pump comprising a housing, a solvent chamber in said housing, an intake conduit in communication with said solvent chamber, a discharge conduit in communication with said solvent chamber, piston means mounted for reciprocation along a predetermined axis in said chamber, spring means for effecting the discharge stroke of said piston means, a fluid pressure chamber in said housing adapted to be placed in communication with a vacuum source, means in said fluid pressure chamber for causing said piston means to move and thereby effect an intake stroke of said piston means against the bias of said spring means while said control means are actuated to place said fluid pressure chamber in communication with said vacuum source, and valve means oscillatable in a direction which is substantially perpendicular to said predetermined axis of reciprocation of said piston means and about an axis which is substantially parallel to said axis of piston reciprocation, said valve means being operable in synchronism with the movement of said piston means to alternately vent said fluid pressure chamber at the termination of said intake stroke to thereby permit the expansion of said spring means to effect said discharge stroke and to place said fluid pressure chamber in communication with said vacuum source at the termination of said discharge stroke to effect said intake stroke to thereby alternately effect a series of intake and discharge strokes while said control means remain actuated, said valve means operatively connected to said piston means by linkage means including means concentric with and telescopically engaging said piston means, said spring means providing the motive power for placing said piston means and said valve means in the position occupied thereby at the beginning of an intake stroke after said control means are moved to cause said pump to return to a dormant portion whereby said pump is prepared to effect an intake stroke in response to a subsequent manual actuation of said control means.

3. A windshield washer pump comprising a housing, said housing including piston means dividing the housing into a solvent chamber and a fluid pressure chamber and being mounted for reciprocation in said solvent chamber, a discharge conduit in communication with said solvent chamber, said piston means including fluid pressure responsive means disposed within said fluid pressure chamber for causing said piston means to be moved in a first direction when said fluid pressure chamber is subjected to fluid pressure from a fluid pressure source, biasing means in operative engagement with said piston means for biasing said piston means in a second direction which is opposite to said first direction when said fluid pressure is interrupted, valve means operatively engageable with said piston means for intermittently venting said fluid pressure chamber and placing said fluid pressure chamber in communication with said fluid pressure source and in synchronism with the movement of said piston means, said valve means including a slide valve oscillatable in a direction which is substantially perpendicular to said first and second directions and about an axis which is substantially parallel to the axis of reciprocation of said piston means and linkage means operatively interconnecting said slide valve and said piston means to convert the reciprocatory motion of said piston means into oscillatory movement of said slide valve, said linkage means including a member concentric with and telescopically engaging said piston means, and sealing means intermediate said solvent chamber and said fluid pressure chamber.

4. A windshield washer pump as set forth in claim 3 wherein said slide valve is oscillatable between a first position wherein it permits communication of said fluid pressure chamber with said fluid pressure source and a second position wherein it permits said fluid pressure chamber to be vented to thereby permit said spring means to return said piston means to the position it occupied before it was moved by the action of fluid pressure in said fluid pressure chamber.

5. A windshield washer pump as set forth in claim 3 wherein said means for converting the reciprocatory motion of said piston means to said oscillatory motion of said slide valve comprises a spiral track associated with said piston means and a follower on said linkage means, said spiral track having a relative longitudinal movement with respect to said follower to thereby convert the reciprocatory movement of said piston means to an oscillatory movement of said follower which is in turn transmitted to said slide valve.

References Cited in the file of this patent

UNITED STATES PATENTS

| | | |
|---|---|---|
| 2,028,371 | Wiltse | Jan. 21, 1936 |
| 2,221,071 | Barfod | Nov. 12, 1940 |
| 2,552,261 | Coughlin | May 8, 1951 |
| 2,649,332 | Rappl | Aug. 18, 1953 |
| 2,670,720 | Bitzer | Mar. 2, 1954 |
| 2,704,054 | Nordenstam | Mar. 15, 1955 |

FOREIGN PATENTS

| | | |
|---|---|---|
| 1,090,677 | France | Oct. 20, 1954 |